April 7, 1964 — A. L. SCOTT — 3,127,910
HOLLOW GLASS FIBER SHAFT
Filed June 30, 1954
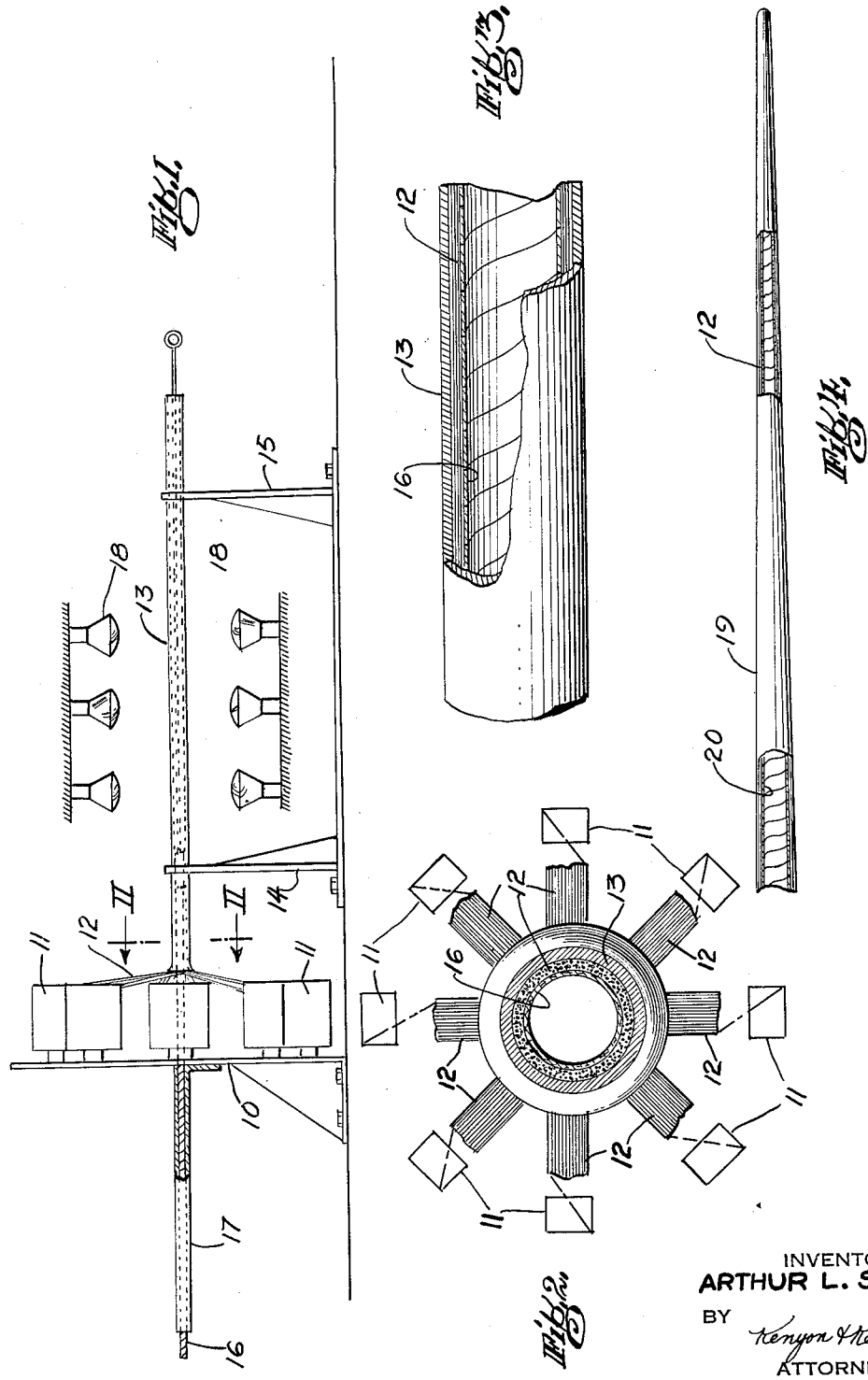
INVENTOR
ARTHUR L. SCOTT
BY Kenyon & Kenyon
ATTORNEYS 3,127,910
HOLLOW GLASS FIBER SHAFT
Arthur L. Scott, Columbia, S.C., assignor to Columbia Products Company, Columbia, S.C., a corporation of South Carolina
Filed June 30, 1954, Ser. No. 440,369
6 Claims. (Cl. 138—144)

The present invention relates generally to the production of rods or shafts constituted by bonded fibrous material which may be used for fishing rods and the like, and more particularly to lightweight, hollow shafts formed of bonded glass fibers adapted for use as arrow shafts.

In addition to lightness and strength, the primary structural requirements for an arrow shaft intended for archery is that the shaft be straight and true balanced, and that these characteristics be maintained with continued use. It is known to make shafts in which the structure is formed by longitudinally-extending glass fibers held together by a bonding agent. Glass fibers are inorganic and are not affected by moisture; they are dimensionally stable and not subject to warping. In products subjected to great flexure, glass-fiber rods will not fatigue or become permanently deformed.

Where, however, the entire shaft or rod is constituted by bonded glass fibers, such shaft structures are relatively heavy, and the fibers along the central axis perform no useful mechanical function. On the other hand, where the glass-fiber shaft is lightened in weight by means for example of a core of balsa wood, the resultant structure is deficient in other respects. Balsa wood has a tendency to absorb moisture. It will deteriorate with weather and, more significantly, it changes dimensionally with changing humidity. Thus, warping of the balsa core will impart a curvature to the flexible shaft or rod. Moreover, a core which was warped even slightly prior to making up the shaft will impart a warp to the finished shaft. This curvature, while not a serious drawback in fishing rods, is highly undesirable in arrow shafts, for it will deleteriously affect the flight characteristics of the shaft.

With a view to obviating the above-noted disadvantages, it is the principal object of this invention to provide an improved hollow shaft to bonded glass fibers having axial linearity and a novel method of producing such shafts.

More particularly, it is an object of the invention to provide a linear shaft consisting of a hollow core of soft, fibrous material of low rigidity and an outer tube fabricated of longitudinally-extending glass fibers held together by a bonding agent, said core having sufficient stiffness to constitute a former for the surrounding glass fibers in the assembling of the shaft.

Another object is to provide a core which is soft and resilient to permit the resin employed to shrink during the curing thereof without the formation of cracks as is the case many times when a hollow shaft is formed on a metal mandrel.

Still another object of the invention is to assemble a hollow fiber glass shaft by feeding into a tubular mold a hollow paper core and flat ribbon-like cables of glass fibers, whereby the horizontally-extending fibers are circumferenitally arranged about the hollow paper core to form a uniform sheath thereabout.

Another object of the invention is to produce a hollow tapered shaft formed of longitudinally-extending glass fibers held together by a bonding agent.

A further object of the invention is to produce a hollow glass fiber shaft of exceptional lightweight in a simple, rapid, and economic manner.

For a better understanding of the invention as well as other objects and further features thereof, reference is had to the following detailed description to be read in conjunction with the annexed drawing wherein like components in the several views are identified by like reference numerals.

In the drawing:

FIG. 1 is a diagrammatic side elevation of a preferred apparatus for assembling a shaft in accordance with the invention.

FIG. 2 is a view taken along plane 2—2 in FIG. 1.

FIG. 3 is an enlarged view, partially in longitudinal section, of a portion of the tubular mold shown in FIG. 1.

FIG. 4 illustrates, partially in section, a modified form of a shaft assembly arrangement in accordance with the invention.

Referring now to the drawing and more particularly to FIGS. 1–3, an arrangement for producing hollow fiber glass shafts, in accordance with the invention, comprises a rack 10 for supporting a plurality of symmetrically-arranged spools or reels 11. Eight reels are provided and, as best seen in FIG. 2, reels 11 are rotatably mounted at equi-spaced, circumferential positions in the vertical plane of rack 10. It is to be understood that a greater or smaller number of reels may be employed. Reels 11 have wound thereabout glass-fiber material in the form of longitudinally-extending continuous filaments grouped together to define a flat, ribbon-like cable 12.

The glass fibers of filaments are very fine and may have diameters of approximately two micro-inches and a tensile strength of 300,000 pounds per square inch. The filaments are coated with a suitable, flexible plastic resin, such as a thermo-setting polymerizing resin of the type which is curable by the application of heat at about 190° F. for approximately four hours. Such resin may be selected from the group comprising polyester resins, phenolic base resins, epoxy resins and polymers and copolymers of the above resins. Preferably, 30 parts by weight of resin is used to coat 70 parts by weight of glass fibers. This proportion, however, may be varied.

The glass-fiber cables 12 are led from the reels 11 into a tubular metal mold 13 which is horizontally mounted on a pair of standards, the mold being rectilinear and of suitable size to produce a shaft of the desired dimensions. Simultaneously fed into mold 13 and disposed concentrically therein is a hollow cylindrical core 16 of soft, fibrous material, such as paper. The paper core 16 is inserted into mold 13 through a tubular guide or duct 17 mounted horizontally on rack 10 in a position in axial alignment with mold 13.

As shown in FIG. 3, the paper core 16 is preferably formed by a helical winding of paper-tape, the convolutions of a winding being in closed abutting relationship. The core is of a structure comparable to the ordinary "soda straw" as to construction and stiffness. The longitudinally-extending glass fibers of the several cables 12 are drawn through the mold 13 simultaneously with the core 16 to fill the annular passage between hollow core 16 and mold 13, thereby to form a compact tubular sheath of uniform thickness about the core. It will be seen that the glass fibers all run parallel to each other and are evenly distributed about the core.

Hollow paper core 16 is relatively soft but possesses sufficient stiffness with respect to inwardly-directed radial pressure to support the relatively light glass fibers circumferentially disposed thereabout. By means of an array of infra-red lamps 18 arranged along the length of mold 13 or by other heat-producing means, heat is applied at the proper temperature and for an appropriate period to the mold to set the resin which had been coated on the fibers prior to assembly. The shaft thus formed has highly desirable properties which are of particular value in arrows for archery. It is extremely light in weight, well balanced and has a high strength per unit of weight. The longitudinally-extending fibers all lie near the outer surfaces of the shaft and serve to greatest advantage as tension and compression members. The inner paper core 16, while acting as a support for the shaft through the assembly operation, has no measurable effect on the mechanical characteristics of the finished shaft. The soft-paper core however deformed in continued use is obviously incapable of distorting or otherwise stressing the glass-fiber shaft in any way.

Referring now to FIG. 4, there is shown a modification of the invention for the purpose of producing a tapered hollow glass shaft. This is accomplished by means of a tapered metal mold 19 into which is inserted a similarly tapered hollow paper core 20, the mold and core being maintained in co-axial relationship. Drawn into the mold in the same manner as has been disclosed in connection with FIG. 1, are a multiplicity of ribbon-like glass-fiber cables 12, which extend longitudinally in parallel relation and are uniformly distributed about the core in the conical space between the mold and the core. As the cross section decreases certain of the fibers are cut to reduce the number of fibers drawn into the mold to keep the thickness of the layer of fibers in the finished product uniform. The glass fibers are coated with resin and are set by the application of heat, in the manner disclosed hereinabove, to form a fiber glass structure. As pointed out previously, the hollow paper core serves as a former during the assembly of the shaft but otherwise has very little effect on the mechanical characteristics of the shaft, which characteristics are determined exclusively by the bonded glass fibers.

Thus, there has been shown what are at present considered to be preferred embodiments of the invention. Obviously, many changes and modifications may be made in these embodiments without departing from the essential spirit of the invention, and it is intended to cover all such changes and modifications as fall within the true scope of the invention in the annexed claims.

What is claimed is:

1. The method of producing hollow shafts of fixed external shape adapted to retain their form without warping regardless of atmospheric conditions comprising withdrawing a multiplicity of flat ribbon-shaped cables from sources thereof, said cables being constituted by longitudinally extending plastic-coated glass fibers, feeding said cables into a rigid straight hollow mold simultaneously with a tubular paper core having a mechanical strength which is negligible compared to the strength of the finished shaft and which is bendable to conform to the shape imparted to the shaft by said mold to form a uniform layer of said coated fibers, about said core fitting into and conforming to the inner walls of said mold and heating said mold at a predetermined temperature and for a predetermined period to set said plastic and bind said fibers together to form a shaft whose mechanical characteristics are independent of said core and which conforms in shape to the shape of said mold.

2. The method of producing hollow arrow shafts of fixed external shape adapted to retain their form without warping regardless of atmospheric conditions comprising withdrawing a multiplicity of flat ribbon-shaped cables from symmetrically arranged sources thereof, said cables being constituted by longitudinally extending glass fibers coated with a thermosetting resin, feeding said cables into a rigid straight hollow mold about a tubular spiral-wound paper core having a mechanical strength which is negligible compared to the strength of the finished shaft and which is bendable to conform to the shape imparted to the shaft by said mold to form concentrically thereabout a uniform layer of said coated fibers fitting into and conforming to the inner walls of said mold, and heating said mold to set said resin to form a shaft whose mechanical properties are independent of said core and which conforms in shape to the shape of said mold.

3. The method of producing a hollow glass shaft adapted to retain its form without warping regardless of atmospheric conditions comprising forming a layer of plastic coated glass filaments extending longitudinally and in uniform thickness about a tubular paper core having a stiffness to support the filaments but a strength negligible as compared to the finished shaft and heating said filaments to set said plastic while simultaneously maintaining said filaments in a straightened condition and applying pressure to maintain said filaments in contact with one another.

4. A hollow shaft for archery arrows and the like characterized by its uniformity of external dimensions and balance and ability to retain its form without warping regardless of atmospheric conditions and changes comprising an outer tubular cylindrical sheath of longitudinally extending straight glass fibers uniformly distributed circumferentially in a layer of uniform external dimension, each of said fibers being bonded to adjacent fibers and maintained in position with a flexible waterproof resin and a tubular paper core formed of a spiral wound paper tape with its edges in closed abutted relation, said core having a mechanical strength which is negligible compared to that of said sheath but adequate to support said fibers prior to the bonding thereof, said sheath determining the mechanical characteristic of said shaft.

5. A hollow shaft for archery arrows and the like characterized by its uniformity of external dimensions and balance and ability to retain its form without warping regardless of atmospheric conditions and changes comprising an outer tubular cylindrical sheath of longitudinally extending straight glass fibers uniformly distributed circumferentially on a layer of uniform external dimension, each of said fibers being bonded to adjacent fibers and maintained in position with a flexible waterproof resin and a tubular paper core, said core having a mechanical strength which is negligible compared to that of said sheath but adequate to support said fibers prior to the bonding thereof, said sheath determining the mechanical characteristics of said shaft.

6. A hollow shaft characterized by its uniformity of external dimensions and balance and ability to retain its form without warping regardless of atmospheric conditions and changes comprising an outer tubular sheath of longitudinally extending straight glass fibers uniformly distributed circumferentially on a layer of uniform external dimension, each of said fibers being bonded to adjacent fibers and maintained in position with a flexible waterproof resin and a tubular paper core, said core having a mechanical strength which is negligible compared to that of said sheath but adequate to support said fibers prior to the bonding thereof, said sheath determining the mechanical characteristics of said shaft.

References Cited in the file of this patent

UNITED STATES PATENTS

| | | |
|---|---|---|
| 2,335,236 | Colt | Nov. 30, 1943 |
| 2,400,031 | Stewart et al. | May 7, 1946 |
| 2,467,999 | Stephens | Apr. 19, 1949 |
| 2,571,717 | Howald et al. | Oct. 16, 1951 |
| 2,614,058 | Francis | Oct. 14, 1952 |
| 2,625,498 | Koch | Jan. 13, 1953 |
| 2,653,887 | Slayter | Sept. 29, 1953 |
| 2,694,661 | Meyer | Nov. 16, 1954 |
| 2,749,643 | Scott | June 12, 1956 |
| 2,751,320 | Jacobs et al. | June 19, 1956 |

FOREIGN PATENTS

| | | |
|---|---|---|
| 511,697 | Belgium | June 14, 1952 |